US009102469B2

(12) United States Patent
Iwata

(10) Patent No.: US 9,102,469 B2
(45) Date of Patent: Aug. 11, 2015

(54) STACKER CRANE

(75) Inventor: Masashige Iwata, Shiga (JP)

(73) Assignee: Daifuku Co., Ltd. (JP)

( * ) Notice: Subject to any disclaimer, the term of this patent is extended or adjusted under 35 U.S.C. 154(b) by 575 days.

(21) Appl. No.: 13/328,165

(22) Filed: Dec. 16, 2011

(65) Prior Publication Data

US 2012/0168255 A1    Jul. 5, 2012

(30) Foreign Application Priority Data

Dec. 16, 2010    (JP) .................................. 2010-280641

(51) Int. Cl.
*B65G 1/06* (2006.01)
*B66B 9/16* (2006.01)
*B65G 1/04* (2006.01)
*B66F 9/07* (2006.01)

(52) U.S. Cl.
CPC .............. *B65G 1/0407* (2013.01); *B66F 9/072* (2013.01)

(58) Field of Classification Search
CPC .............................. B66F 9/072; B65G 1/0407
USPC ........................................................ 187/244
See application file for complete search history.

(56) References Cited

U.S. PATENT DOCUMENTS

| 2004/0228709 | A1* | 11/2004 | Ueda .............................. 414/279 |
| 2006/0102433 | A1* | 5/2006 | Ueda .............................. 187/238 |
| 2010/0172728 | A1  | 7/2010 | Amada |

FOREIGN PATENT DOCUMENTS

| JP | 2003-237909 |   | 8/2003 |
| JP | 2006-076715 |   | 3/2006 |
| JP | 2009-269731 | A * | 11/2009 |
| JP | 2012-193003 | A * | 10/2012 |

OTHER PUBLICATIONS

English Machine Translation of JP 2009-269731 A.*
European Search Report of European Patent App. No. 11193857.7.

* cited by examiner

*Primary Examiner* — William E Dondero
*Assistant Examiner* — Diem Tran
(74) *Attorney, Agent, or Firm* — Mayback & Hoffman, P.A.; Gregory L. Mayback; Rebecca A. Tie

(57) ABSTRACT

A stacker crane includes a lower frame having running wheels running along a rail at both front and rear end portions thereof. The lower frame has a connecting frame that connects front and rear wheel support frames for supporting the running wheels to each other. The front support rod is held by a flange at its lower end surface, which is formed at the lower end portion of the front side wheel support frame. The side surface of the front support rod is connected and supported by the front side wheel support frame. The rear support rod is held by a flange, which is formed at the lower end portion of the rear side wheel support frame at its lower end surface and the side surface of the rear support rod is connected and supported by the rear side wheel support frame 24.

17 Claims, 16 Drawing Sheets

STACKER CRANE

CROSS-REFERENCE TO RELATED APPLICATIONS

This application claims the priority, under 35 U.S.C. §§119 and 371, of Japanese patent application No. 2010-280641, filed Dec. 16, 2010; the prior application is herewith incorporated by reference in its entirety.

STATEMENT REGARDING FEDERALLY SPONSORED RESEARCH OR DEVELOPMENT

Not Applicable

FIELD OF THE INVENTION

The present invention relates to a stacker crane. In particular, a stacker crane including a lower frame having running wheels runnable along rails at both front and rear end portions of the frame, front and rear support rods standing from the front and rear end portions of the lower frame, an upper frame for connecting the top ends of the front and rear support rods to each other, and a platform being guided by the front and rear support rods.

Such a stacker crane is installed in a storage so that it travels along the front side of storage racks having storage areas for storing articles lengthwise and breadthwise, and so that it works to put articles in the storages of the storage racks or to pick up the articles from the storage.

BACKGROUND OF THE INVENTION

A conventional stacker crane is disclosed in Japanese Patent Preliminarily Publication No. 2003-237909, where a lower frame comprises a connecting frame for connecting front and rear wheel support frames, by which running wheels are supported, and where the front and rear support rods standing from the lower frame are mounted and supported by the connecting frame at their lower ends.

Another conventional stacker crane is disclosed in Japanese Patent Preliminarily Publication No. 2006-76715, where a lower frame comprises a connecting frame for connecting front and rear wheel support frames, by which running wheels are supported, and where the front and rear support rods standing from the lower frame are mounted on the top surfaces of the front and rear wheel support frames at their lower ends, and extended guide rails for guiding a platform are provided and being connected to the guide portion of the platform at the front and rear support rods.

The conventional stacker crane disclosed in the Japanese Patent Preliminarily Publication No. 2003-237909 is disposed to have the front and rear support rods mounted to and supported by the connecting frame at their lower ends. Therefore, the weight of the front and rear support rods, the upper frame, and the platform and the weight of articles held by the platform act against the connecting frame, which connects the front and rear wheel support frames for supporting the running wheels.

Since such a heavy weight acts on the connecting frame, the connecting frame must have sufficient strength for the weight, which made the connecting frame expensive and difficult to lower cost for the lower frame itself.

The conventional stacker crane disclosed in the Patent Preliminarily Publication No. 2006-76715 is disposed to have the front and rear support rods mounted on the top surface of the front and rear wheel support frames at their lower ends. Therefore, the front and rear wheel support frames have to bear the weight of the front and rear support rods, the upper frame, the platform and the weight of articles held by the platform.

Since such a heavy weight does not act on the connecting frame for connecting the front and rear wheel support frames, the connecting frame does not need to be so strong and therefore could be manufactured cheaper.

However, as mentioned above, the stacker crane disclosed in the Patent Preliminarily Publication No. 2006-76715 includes extended guide rails for guiding a platform, which are connected to the guide portion of the platform at the front and rear support rods, on the side surfaces of the front and rear wheel support frames. This stacker crane is constructed such that the platform is guided by the extended guide rails, which complicates the guiding system of the platform. Therefore, the lower frame of this conventional type of stacker crane cannot be made cheaper.

SUMMARY OF THE INVENTION

The purpose of the present invention is to provide a stacker crane having a less expensive lower frame.

The stacker crane according to the present invention comprises a lower frame having running wheels at both front and rear ends which freely run along rail(s); front and rear support rods standing from both the front and rear ends of the lower frame; an upper frame for connecting the upper ends of the front and rear support rods to each other; and a platform being guided by the front and rear support rods so as to be freely elevated therealong. The first characteristic structure of the stacker crane is as follows:

the lower frame is comprised of the front and rear wheel support frames for supporting running wheels and a connecting frame, and these wheel support frames are connected to the lower frame via the connecting frame;

a flange for holding and mounting the lower end surface of the front support rod of the front and rear support rods is provided at a lower end of the front wheel support frame of the front and rear wheel support frames, and a flange for holding and mounting the lower end surface of the rear support rod of the front and rear support rods is provided at the lower end of the rear wheel support frame of the front and rear wheel support frames;

the front support rod is disposed to have the lower end surface thereof held on the flange of the front wheel support frame and the side surface of the front support rod is connected and supported by the front wheel support rod; and the rear support rod is disposed to have the lower end surface thereof held on the flange of the rear wheel support frame and the side surface of the rear support rod is connected and supported by the rear wheel support rod.

That is to say, according to the invention, the lower end surface of the front support rod is held on the flange of the front wheel support frame, while the lower end surface of the rear support rod is held on the flange of the rear wheel support frame. Therefore, the weight of the front and rear support rods, the upper frame, the platform and the articles to be held by the platform is born by the front and rear wheel support frames, so that heavy weight acting on the connecting frame, which connects the front and rear running wheels support frames for supporting the running wheels, can be prevented.

In addition, since the side surface of the front support rod is connected and supported by the front wheel support frame and the side surface of the rear support rod is connected and supported by the rear wheel support frame, the conditions that the lower end surface of the front support rod is supported by the flange of the front wheel support frame and that the lower end surface of the rear support rod is supported by the flange of the rear wheel support frame can be accurately maintained. Therefore, even if making compact the flange provided at the lower end of the front wheel support frame or the flange at the lower end of the rear wheel support frame, it is possible to support the lower end surfaces of the front and rear support rods appropriately on the flange of the front and rear wheel support frames, respectively.

Further, the flange for holding and mounting the lower end surface of the front support rod is formed at the lower end portion of the front wheel support frame, and, the flange for holding and mounting the lower end surface of the rear support rod is formed at the lower end of the rear wheel support frame, so that the front and rear support rods can be positioned over the whole moving range of the platform. Therefore, the platform can be guided by the front and rear support rods over the whole moving range of the platform.

As a result, heavy weight acting on the connecting frame, which connects the front and rear wheel support frames for supporting running wheels, can be prevented with the aid of the construction that the lower end surfaces of the front and rear rods are held by the flanges formed with the front and rear wheel support frames. Thus, the flanges can be made cheaper. In addition, since the size of the flanges to be formed with the front and rear wheel support frames can be made compact, increases to the cost of manufacturing the front and rear wheel support frames, which is caused by forming the flanges, can be avoided. Furthermore, since the platform can be guided by the front and rear support rods over the whole moving range of the platform, the guiding structure for the platform does not become so complex.

In short, according to the first characteristic structure of the present invention, a stacker crane can be provided where the weight of the front and rear support rods, the upper frame, the platform and the articles to be held by the platform is appropriately supported and the platform can be suitably guided over the whole moving range of the platform, while, at the same time, the cost for manufacturing the lower frame can be kept low.

The second characteristic structure of the present invention, in addition to the first characteristic structure mentioned above, is as follows:

a mount for the front support rod, which is for holding and mounting a portion other than the portion of the lower end surface of the front support rod to be held by the flange of the front wheel support frame in, and a mount for the rear support rod, which is for holding and mounting a portion other than the portion of the lower end surface of the rear support rod to be held by the flange of the rear wheel support frame, are provided on the connecting frame.

That is to say, in addition to the fact that the lower end surfaces of the front and rear support rods are held by the flanges formed with the front and rear wheel support frames, the portions, which are different from the portions of the lower end of the front and rear support rods, which are held by the flange, are held by the mounts provided on the connecting frame for the front and rear support rods.

In other words, the lower end surface of the front support rod and the lower end surface of the rear support rod are held and supported both by the flange formed with the front and rear wheel support frames and by the mount for front support rod and the mount for rear support rod which are provided on the connecting frame, respectively.

Since the different portions on the lower end surface of the front support rod are held and supported both by the flange formed on the front wheel support frame and by the mount for the front support rod provided on the connecting frame, it is possible to hold the lower surface of the front support rod while inhibiting the inclination of the front support rod; and since the different portions on the lower end surface of the rear support rod are held and supported both by the flange formed on the rear wheel support frame and by the mount for the rear support rod provided on the connecting frame, it is possible to hold the lower surface of the rear support rod while inhibiting the inclination of the rear support rod. Therefore, the correct attitude of the front and rear support rods can be maintained.

Incidentally, in the case of rectangular shaft type front and rear support rods, for example, arranged such that one side of the lower end surface of the rod is supported by the flange formed with the wheel support frame and the other side of the lower end surface, which is adjacent to the one side being supported by the flange, is supported by the another mount for the front support rod or the mount for the rear support rod, the inclination of the front and rear support rods can be appropriately and easily controlled in the back and forth and left and right directions.

Thus, according to the second characteristic structure of the present invention, a stacker crane can be provided by which the front and rear support rods can be held and supported in a condition in which the front and rear support rods are hard to be inclined, in addition to the function and effect in accordance with the first characteristic structure.

The third characteristic structure of the stacker crane according to the present invention, in addition to the first and second characterized structures mentioned above, is as follows:

a first support for the front support rod, which is connected to a portion different from the portion being connected and supported by the front wheel support frame of the side surfaces of the front support rod, and a second support for the rear support rod, which is connected to the another portion different from the portion being connected to and supported by the rear wheel support frame of the side surfaces of the rear support rod, are provided with the connecting frame.

That is to say, in addition to the fact that the side surfaces of the front and rear support rods are connected to the front and rear wheel support frames, the portions other than those connected to the front and rear wheel support frames of the side surfaces of the front and rear support rods are connected to the first and second supports for the front and rear support rods, respectively, which are provided with the connecting frame.

In other words, the side surfaces of the front and rear support rods are connected to both the front and rear wheel support frames and to both the first and second supports for the front and rear support rods, respectively, which are provided with the connecting frame.

Therefore, since the side surfaces of the front and rear support rods are supported by the front and rear wheel support frames and by the first and second supports for the front and rear wheel support at different portions, rotation of the front and rear support rods about the shaft center along the longitudinal direction of the rods or inclination of the front and rear support rods can be appropriately prevented, so that the correct attitude of the front and rear support rods can be maintained.

Incidentally, in the case of rectangular shaft type front and rear support rods, rotation of the front and rear support rods about the shaft center along the longitudinal direction of the rods or back and forth/left and right inclination of the front and rear support rods can be appropriately prevented by a configuration where one of the four surfaces of the shaft is connected to the front and rear wheel support frames, respectively, and another one of the four surfaces, which is adjacent to the one of the four surfaces, is connected to the front and rear support for the front and rear support rods, Thus, according to the third characteristic structure of the present invention, a stacker crane can be provided by which the rotation of the front and rear support rods about the shaft center along the longitudinal direction of the rods or the inclination of the front and rear support rods can be prevented.

The fourth characteristic structure of the stacker crane according to the present invention, in addition to the first to third characteristic structures mentioned above, is as follows:

the front support rod is disposed on the back side of the front wheel support frame; and the rear support rod is disposed on the front side of the rear wheel support frame.

That is to say, since the front support rod is positioned on the back side of the front wheel support frame and the rear support rod is positioned on the front side of the rear wheel support frame, the front running wheels and the front support rod are lined up along the back and forth direction of the stacker crane and the rear running wheels and the rear support rod are lined up along the back and forth direction of the stacker crane. Therefore, the load acting on the front wheel support frame via the front support rod can be suitably carried by the front running wheels, and the load acting on the rear wheel support frame via the rear support rod can be suitably carried by the rear running wheels.

In other words, the weight of the front and rear support rods, the upper frame, the platform, and the articles held on the platform can be supported by the front and rear running wheels in balance and, therefore, the lower frame becomes harder to incline back and forth and around; as a result, the attitude of the front and rear support rods can be stabilized.

In short, according to the fourth characteristic structure of the present invention, a stacker crane can be provided by which the attitude of the front and rear support rods is stabilized, in addition to the function and effect in accordance with any one of the first to third characteristic structures.

The fifth characteristic structure of the stacker crane according to the present invention, in addition to the first to fourth characterized structures mentioned above, is as follows:

the connecting frame is provided at one of the lateral sides of the front and rear wheel support frames.

That is to say, since the connecting frame is provided at one of the lateral sides of the front and rear wheel support frames, the structure of the lower frame can be made simpler in comparison to a case in which the connecting frame is disposed at both the lateral sides of the front and rear wheel support frames.

That is to say, by adopting the structure in which the connecting frame is provided at one of the lateral sides of the front and rear wheel support frames, focusing attention on the fact that for the weight of the front and rear support rods, the upper frame, the platform, and the articles held on the platform can be supported by the front and rear running wheels support frames, no heavy load acts on the connecting frame, the cost for manufacturing the lower frame can be made cheaper.

In short, according to the fifth characteristic structure of the present invention, a stacker crane can be provided by which the cost for manufacturing the lower frame can be reduced, in addition to the function and effect of the first to fourth characteristic structure.

The sixth characteristic structure of the stacker crane according to the present invention, in addition to the first to fifth characteristic structures mentioned above, is as follows:

one of the running wheels on the front and rear end of the lower frame is a driving wheel and the other running wheel is an idling wheel; and the idling wheel is equipped in the wheel support frame therefor in a manner that the vertical position of the idling wheels are adjustable.

That is to say, since one of the running wheels on the front and rear end portions of the lower frame is a driving wheel and the other of the running wheel is as an idling wheel, the structure of these wheels can be made simpler, in comparison to a case in which both front and rear running wheels are driving wheels.

Further, since the idling wheel, which is not connected to any driving measures, such as an electric motor, is rigged to the wheel support frame therefor so that the vertical position of the idling wheel is adjustable, the inclination of the lower frame in a back and forth direction can be controlled by the vertical position adjustment of the idling wheel.

In a condition in which the front and rear support rods and the upper frame are mounted on the lower frame, the front and rear support rods will sometimes be inclined in a back and forth direction by some manufacturing error such as an assembling error. In such a case, according to the invention, it can be possible to put the front and rear support rods into an appropriate posture where the rods do not incline in a back or forth direction by adjusting the vertical position of the idling wheel with respect to the wheel support frame.

Since the idling wheel is not connected to any driving measure, such as an electric motor, it is easy to rig the idling wheel with respect to the wheel support frame in a manner to make the vertical position of the wheel adjustable. Therefore, even if the idling wheel is rigged to be adjustable in a vertical direction, the construction of the lower frame is not so complex.

In other words, when rigging driving wheels, to which a driving measure, such as an electric motor, is connected, in a vertically adjustable manner with respect to the wheel support frame, it will be necessary to arrange special measures to the driving measures. For instance, in such a case in which the driving measures, such as an electric motor, is integrally rigged with the driving wheels, special wiring for controlling the driving measures should be configured so that the driving wheels are movable in a vertical direction. Then, the structure of the lower frame will be complex.

In short, according to the sixth characteristic structure of the present invention, a stacker crane can be provided by which the posture of the front and rear support rods can be controlled, in addition to the function and effect in accordance with anyone of the first to fifth characteristic structures. According to the structure, the inclination of the front and rear support rods in the back and forth direction can be prevented, without making the construction of the lower frame overly complex.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
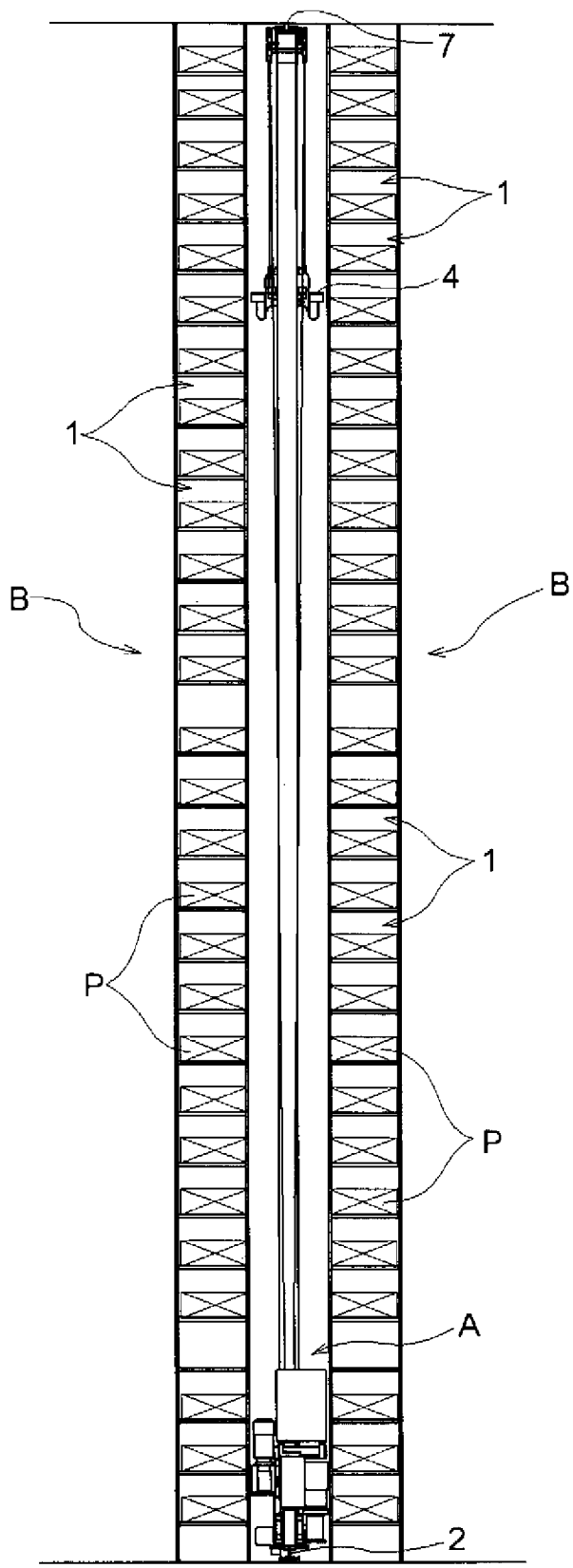
FIG. 1 is a front elevational view of an automated storage according to the invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Figure 2:
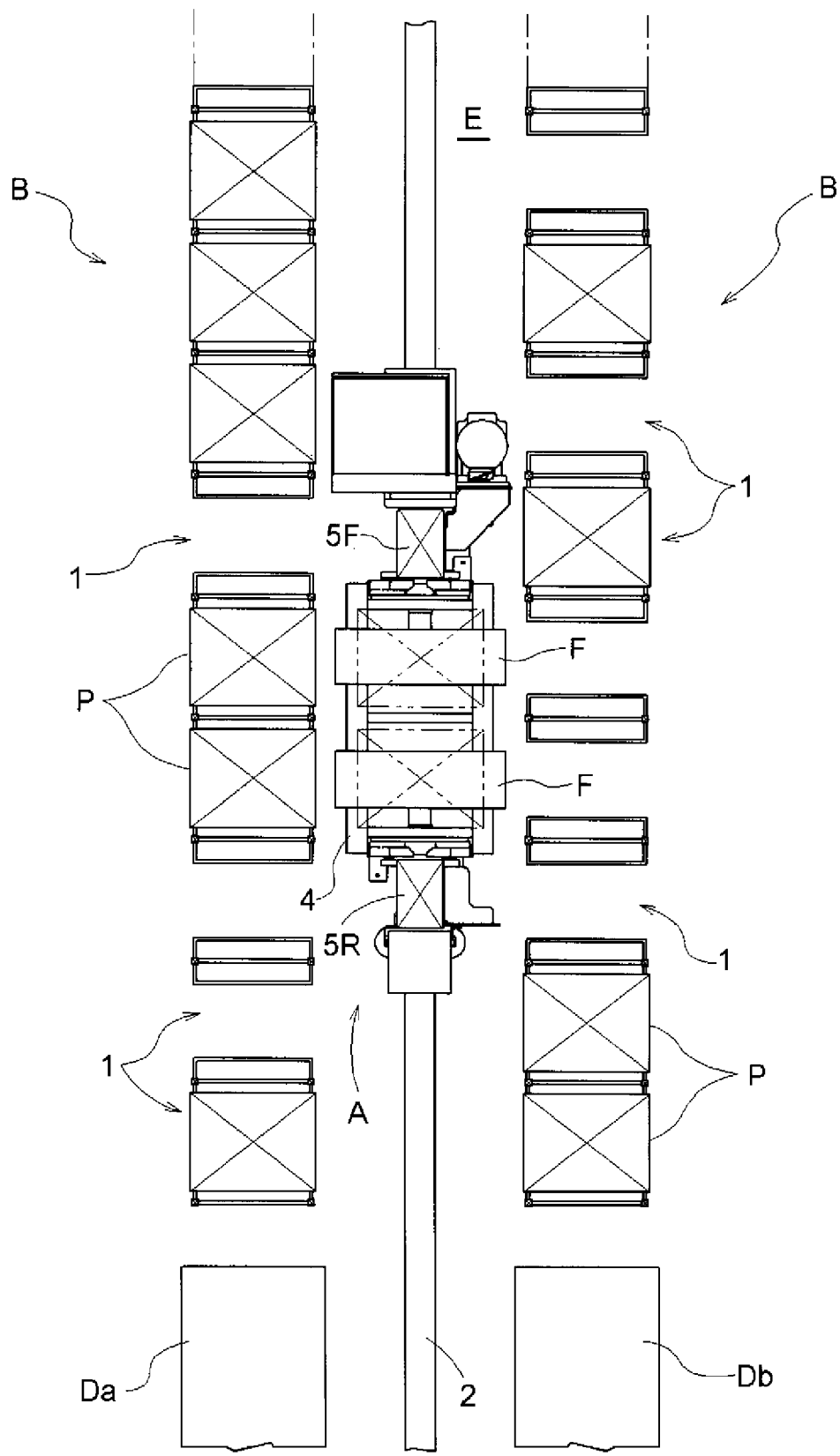
FIG. 2 is a fragmentary, schematic top plan view of the automated storage according to the invention.

Described now are exemplary embodiments of the present invention. Referring now to the figures of the drawings in detail and first, particularly to FIGS. 1 and 2, there are shown front and top views of an automated storage to which the stacker crane according to the present invention is applied. As shown in FIGS. 1 and 2, the automated storage comprises a pair of article storage racks B, which include a plurality of storage spaces 1 for storing articles P, such as bucket-like containers, side by side; a stacker crane A, which travels through working passage E between the pair of storage racks B; an article loading part Da for bringing in articles P to be stored in the storage racks B from the outside and an article unloading part Db for taking out articles P stored in the storage racks B to the outside, which are set at both sides of the pair of storage racks B, respectively. The stacker crane A operates to pick up articles P stored in the storage spaces 1 and bring them to the article unloading part Db and to take out articles P, which have been loaded to the article loading part Da and store them into the storage spaces 1.

The article loading part Da and the article unloading part Db can be conveyors for mounting and transferring articles P. No example is shown there, but at the article transferring place between the article loading and unloading parts Da and Db and the stacker crane A, an article lift for elevating articles, which is configured such that a space is formed for inserting a fork device F is provided, which will be explained later, for transferring articles under articles P.

Figure 3:
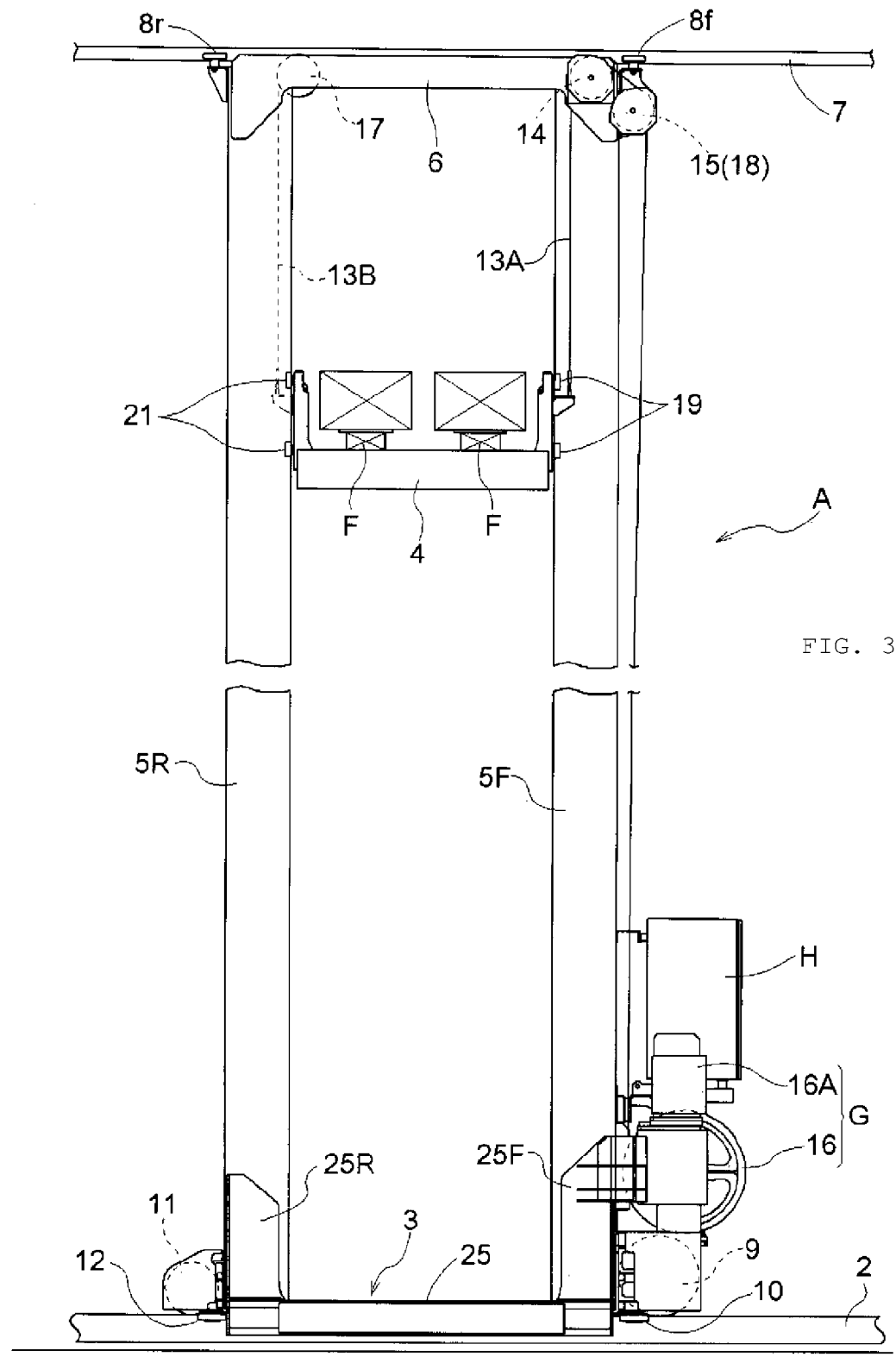
FIG. 3 is a fragmentary, side elevational view of a stacker crane according to the invention.
Figure 4:
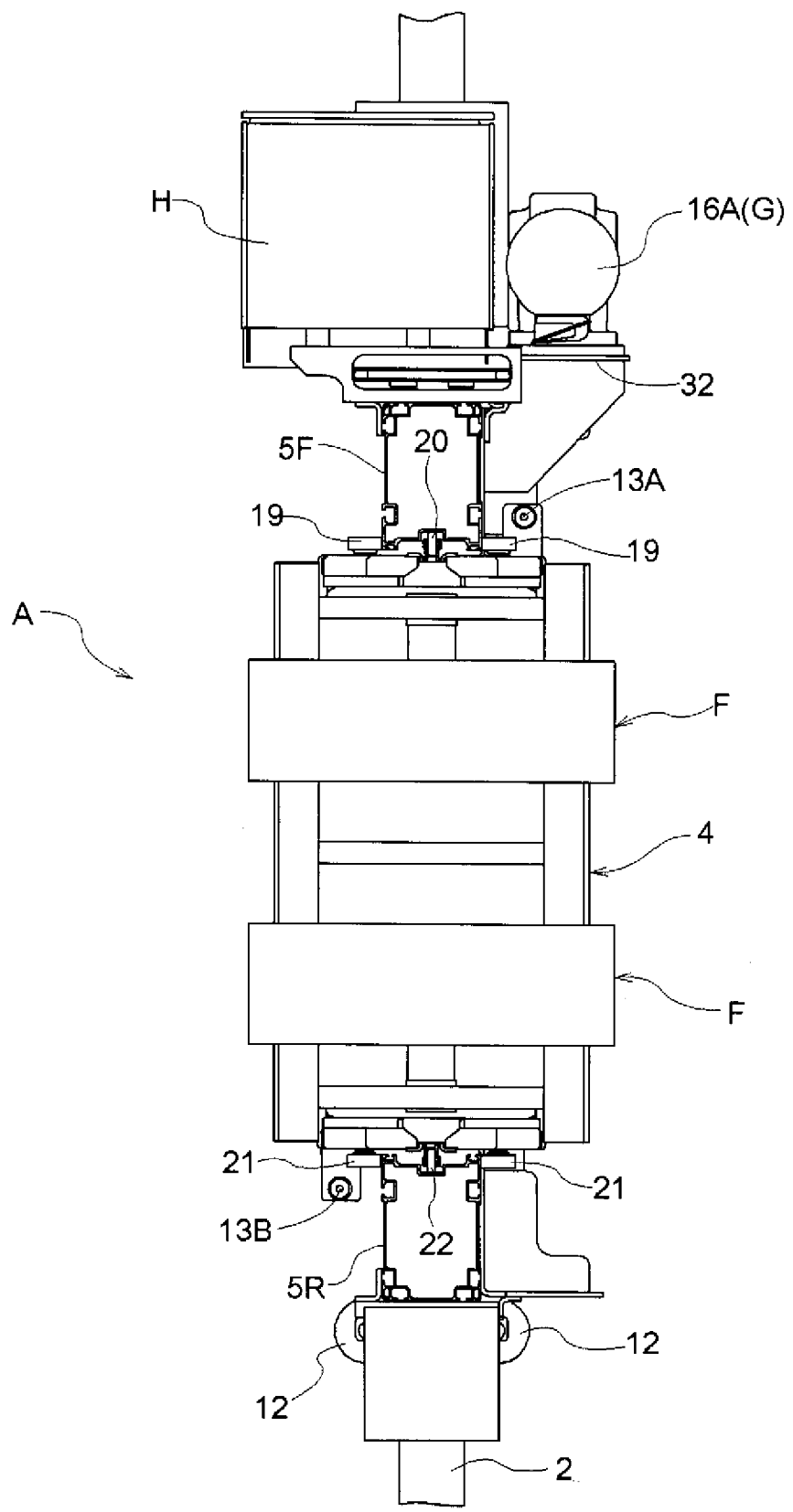
FIG. 4 is a cross-sectional view of the stacker crane of FIG. 3.
Figure 5:
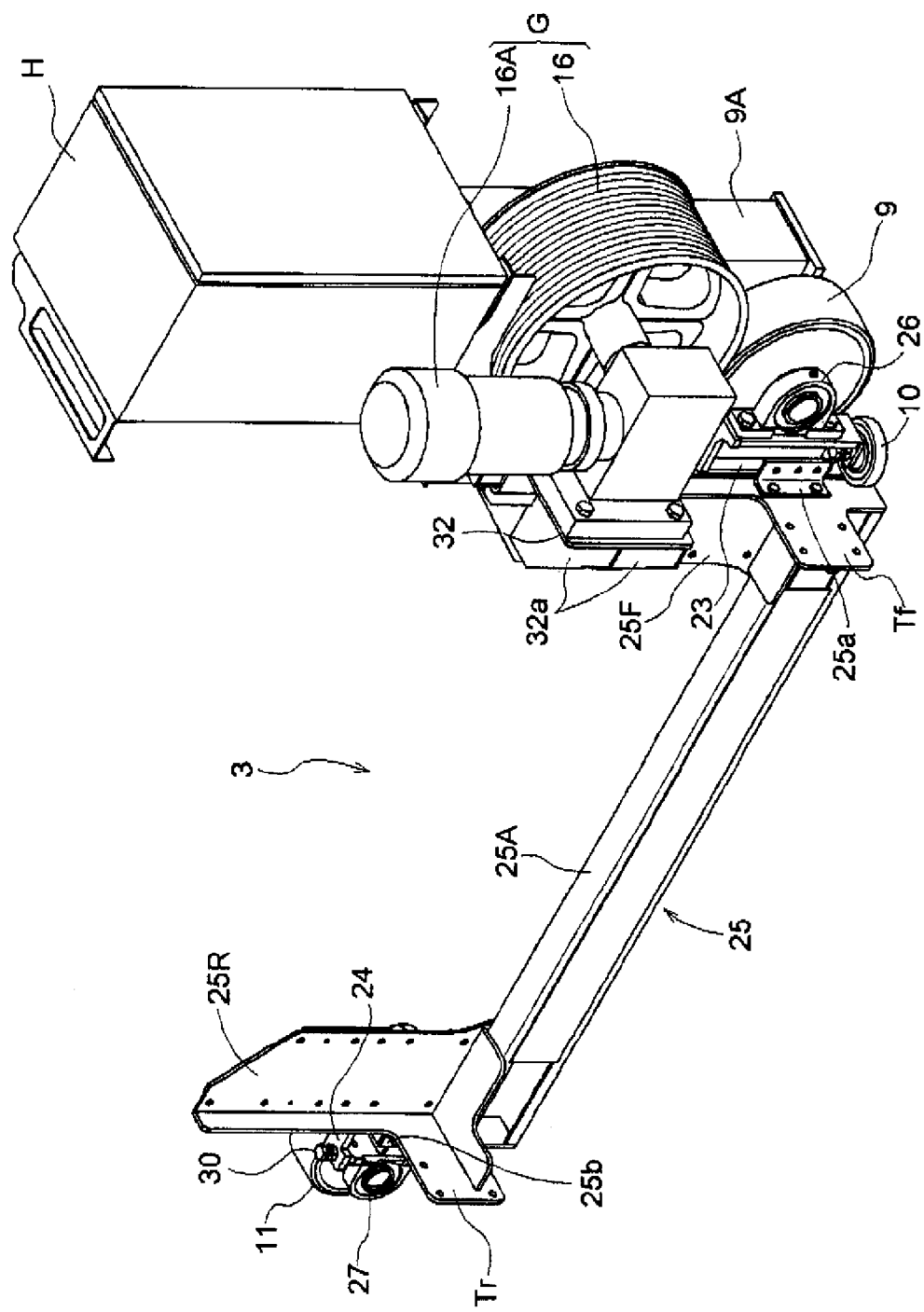
FIG. 5 is a perspective view of the lower frame of the stacker crane of FIG. 3.

As shown in FIGS. 3 and 4, the stacker crane A comprises a lower frame 3, which travels along a single travelling rail 2 provided on the floor along the working passage E; a pair of front and rear support rods 5F and 5R, which stand from the front and rear ends of the lower frame 3 in the traveling direction thereof to guide a platform 4 being movable up and down; and an upper frame 6 for connecting the upper ends of the support rods 5F and 5R to each other. In the automated storage, a guide rail 7 is also provided beneath the ceiling side of the working passage E. On the top ends of the pair of front and rear support rods 5F and 5R are provided, a pair of left and right guide rollers 8f and 8r, respectively (see FIG. 13), being urged against the side surfaces of the guide rail 7, respectively.

Therefore, the stacker crane A travels through the working passage E, while being guided by the travelling rail 2 and the guide rail 7 so as to carry out the loading and/or unloading operation of articles P mentioned above.

As also mentioned in FIGS. 5 to 8, the lower frame 3 comprises: a driving wheel 9 as a running wheel mounted on an upper surface of the travelling rail 2, and a pair of left and right guiding wheels 10 being urged against the side surface of the travelling rail 2 on one of the sides of the frame in the back and front direction; while on the other sides of the lower frame 3 in the back and front direction, an idling wheel 11 as a running wheel is mounted on the upper surface of the travelling rail 2, and a pair of left and right guiding wheels 12, which are also urged against the side surface of the travelling rail 2 are provided; so that the lower frame 3 travels along the travelling rail 2.

It is noted that the explanation that will be made is with an assumption that the side on which the driving wheel 9 is positioned is the front side of the stacker crane A and the side on which the idling wheel 11 is positioned is the back side of the stacker crane A.

Thus, concerning the pair of front and rear support rods 5F and 5R, the front support rod 5F is on the driving wheel 9 side and the rear support rod 5R is on the idling wheel 11 side.

It is also noted that the front and rear direction of the stacker crane A will be described as a body front and rear direction and the width direction of the stacker crane A as a body width direction.

Figure 16:
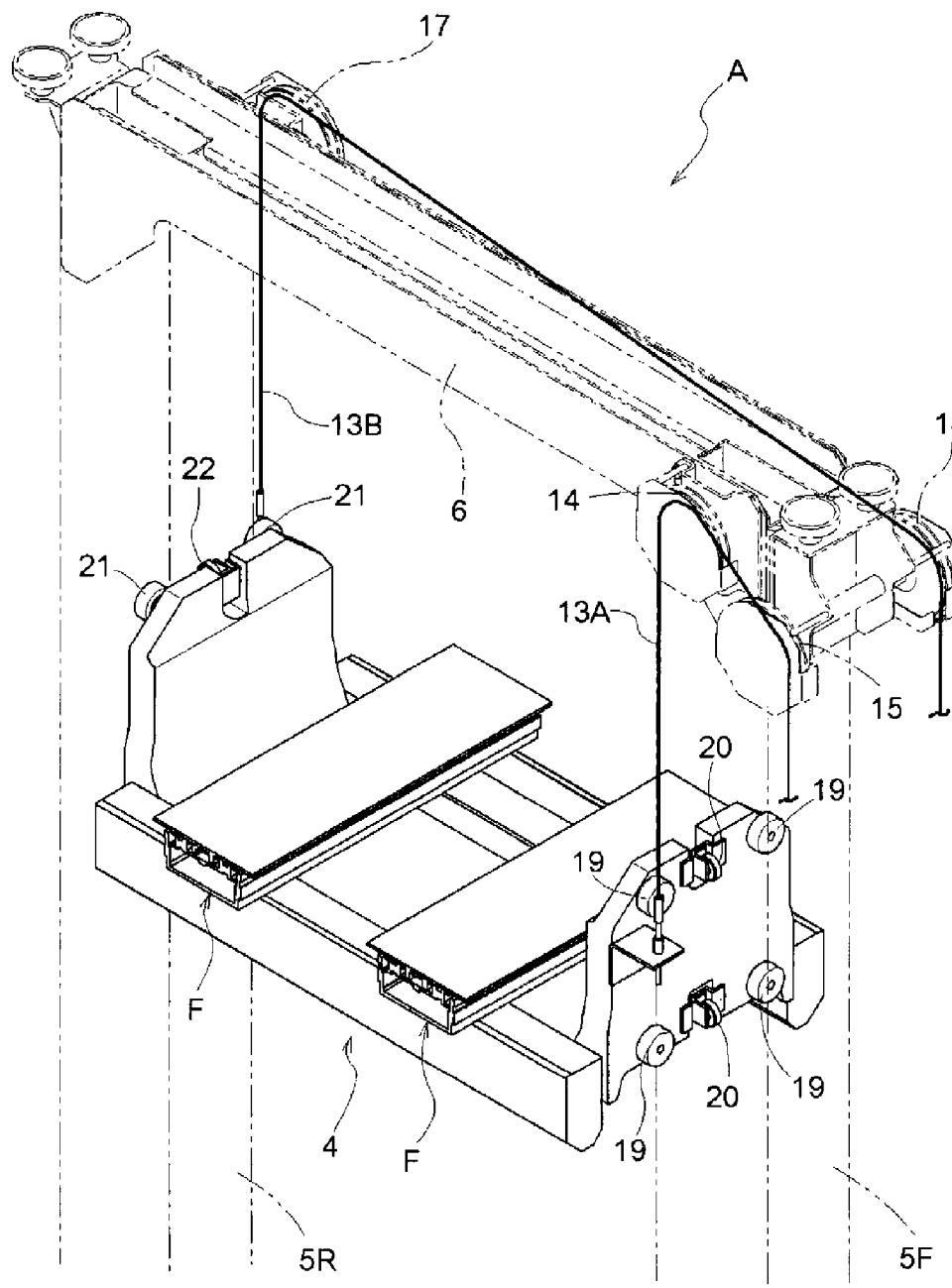
FIG. 16 is a partially hidden, perspective view showing a guided structure of the platform according to the invention.

As represented in FIGS. 3, 4 and 16, the platform 4 is suspended and supported by lifting wires 13A and 13B, which are connected to both the front and rear end portions of the platform 4 as lifting codes, two fork devices F are provided on the platform 4 side to side in the front and rear direction of the body.

The distance between the two fork devices F is the same as that between the storage spaces 1 in the article storage rack B, which are provided in a stack width direction, i.e., the front and rear direction of the body, as represented in FIG. 2, so that the two fork devices F can work the delivery of articles for two storage spaces 1 arranged in the stack width direction at the same time.

As represented in FIGS. 3 and 16, out of the pair of lifting wires 13A and 13B for suspending and supporting the platform 4, the lifting wire 13A connected to the front side of the platform 4 is extended in an upward direction from the platform 4 to a first guide 14 provided at the front side of the upper frame 6, then to a second guide 15 provided at the upper end of the front support rod 5F. At the first guide 14 and the second guide 15, the wire 13A is guided in the downward direction, changed to the lower direction and then further extended to a reel drum 16 (see FIG. 5), which is provided at the lower end of the front support rod 5F, where the wire 13 A is reeled.

Then, out of the pair of lifting wires 13A and 13B for suspending and supporting the platform 4, the lifting wire 13B connected to the rear side of the platform 4 is extended in the upward direction from the platform 4 first to the third guide 17, which is provided at the rear side of the upper frame 6. At the third guide 17, the wire 13B is guided to the front side of the upper frame 6, then into the downward direction via a fourth guide 18 at the upper portion of the front support rod 5F, and then reeled in on the reel drum 16.

The reel drum 16 is driven to be reversely rotated with the aid of electric motor 16A, so that the platform 4 moves up and down by reeling and unreeling the lifting wires 13A and 13B to and from the drum 16.

As shown in FIGS. 3, 4 and 16, wheels 19 for restricting the lateral position of the platform are urged against both the side surfaces of the front support rod 5F and are provided at the front end of the platform 4, and wheels 20 for restricting the front and rear position of the platform are urged against the rear surface of the front support rod 5F and are provided on the front end of the platform 4.

Further, wheels 21 for restricting the lateral position of the platform are urged against both the side surfaces of the rear support rod 5R and are disposed at the rear end of the platform 4 and wheels 22 for restricting the front and rear position of the platform are urged against the front surface of the rear support rod 5R and are provided on the rear side end of the platform 4.

Therefore, the platform 4 is lifted up and down along the front and rear support rods 5R and 5B guided by the front and rear support rods 5R and 5B, while the position of the platform 4 is restricted in the vertical direction of the body and in the front and rear direction of the body.

Figure 14:
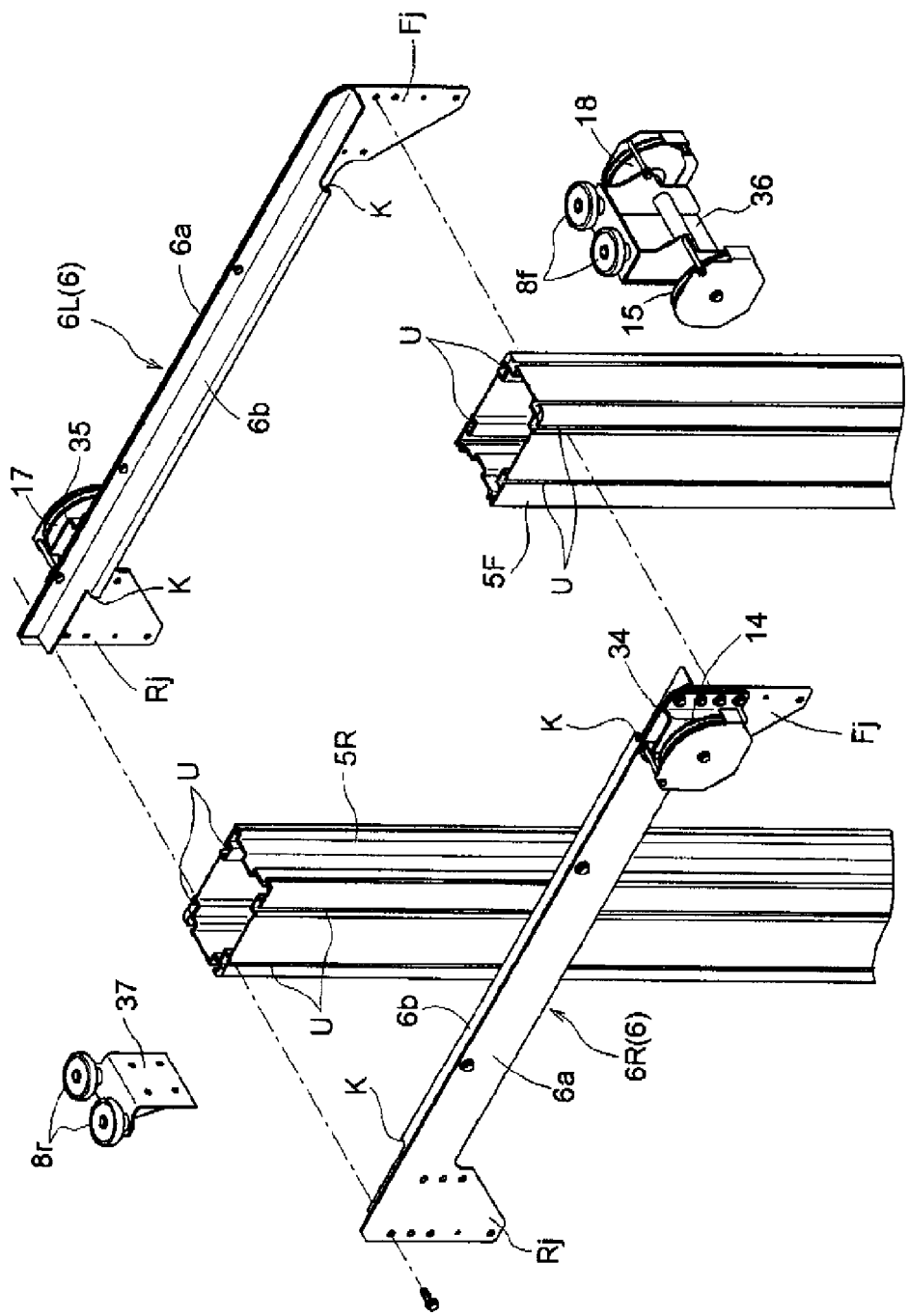
FIG. 14 is a fragmentary, exploded perspective view of the upper frame of FIG. 13.

As shown in FIGS. 4 and 14, the front and rear support rods 5F and 5R are formed as in a rectangular axial shape, i.e., in a rectangular tube shape. Concave grooves U are formed within the side surfaces of the rods, which are constructed such that the penetralia is wider than the entrance, along the longitudinal direction of the support rods. Other members are connected to the support rods by the concave grooves U as explained below.

That is to say, connecting plates (tap plates) with screw holes are inserted in the concave grooves U, and the support rods 5F and 5R and other members are connected together by bolts that are threadable to the connecting plates.

As shown in FIGS. 5 to 8, the lower frame 3 comprises a driving wheel support frame 23 for supporting the driving wheel 9, a driving wheel motor 9A for reversely driving the driving wheel 9, an idling wheel support frame 24 for supporting the idling wheel 11, and a connecting frame 25 traversing between the driving wheel support frame 23 and the idling wheel support frame 24.

The guide wheels 10 are supported in the driving wheel support frame 23 and the guide wheels 12 are supported in the idling wheel supporting frame 24. It is noted that, in the present exemplary embodiment, the driving wheel support frame 23 and the idling wheel support frame 24 correspond to the front wheel support frame and the rear wheel support frame, respectively.

Figure 8:
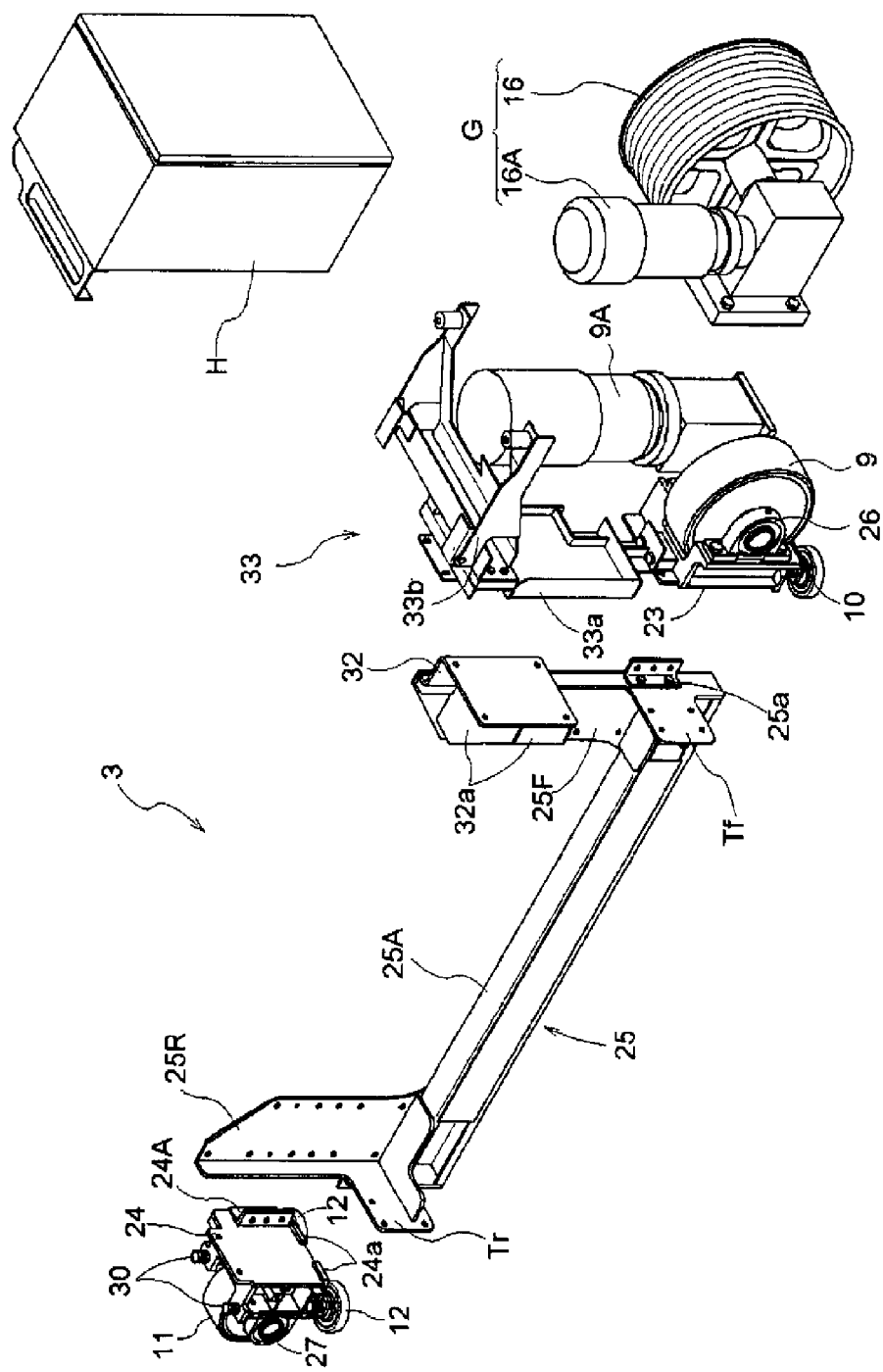
FIG. 8 is an exploded perspective view of the lower frame of the stacker crane of FIG. 3.

As illustrated in FIG. 8, the driving wheel support frame 23 has an inverted C-shape viewed from the top; on the pair of left and right end surfaces on the front side of the frame, a pair of left and right bearing units 26 is fixed with the aid of bolts for rotatably supporting the driving wheel 9.

The driving wheel 9 is installed in the left and right frame portions of the driving wheel support frame 23 such that the rear side portion of the wheel body is set in the frame portions.

Figure 9:
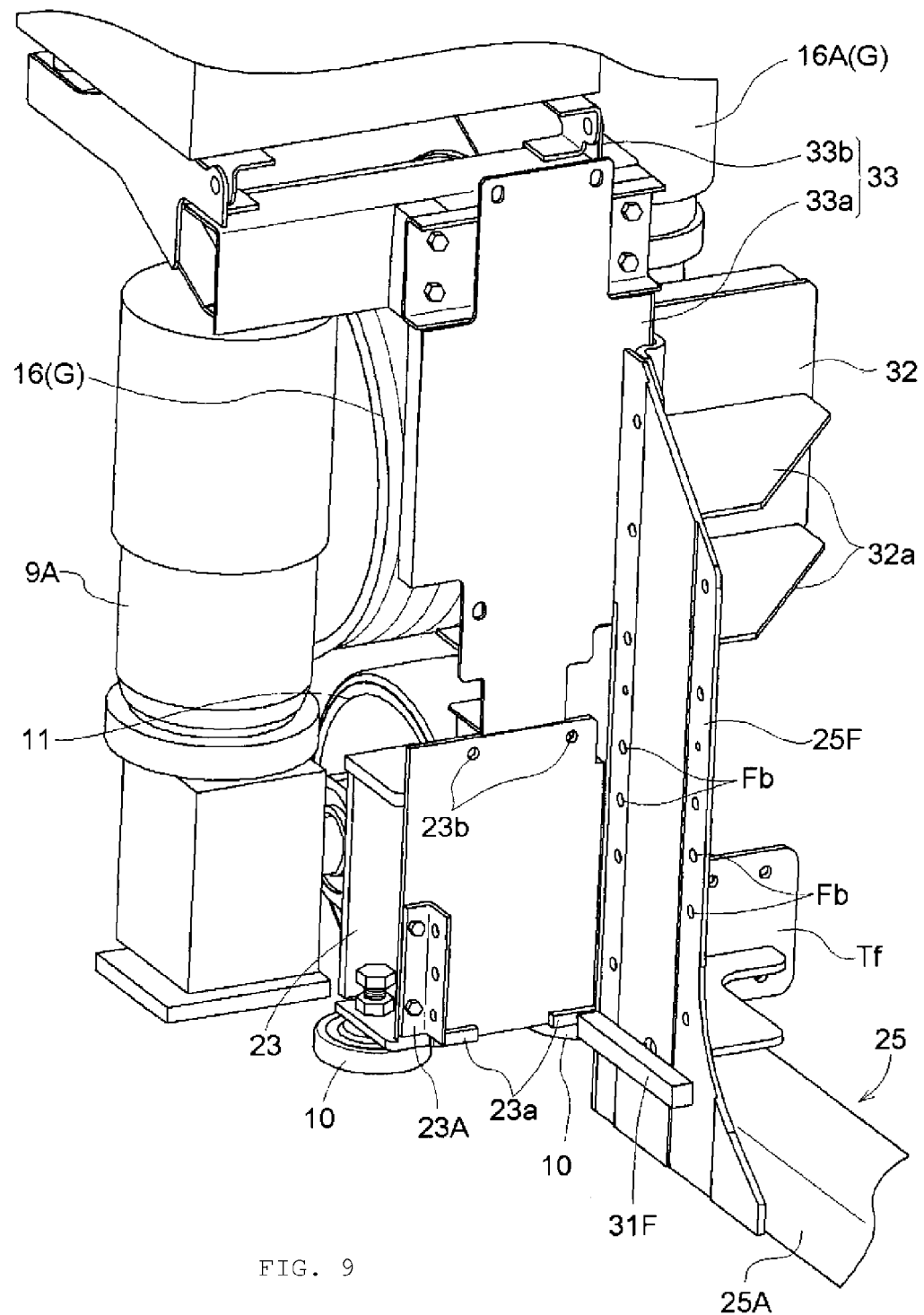
FIG. 9 is a fragmentary, perspective view of an attachment portion of the front support rod in the lower frame of FIG. 5.
Figure 11:
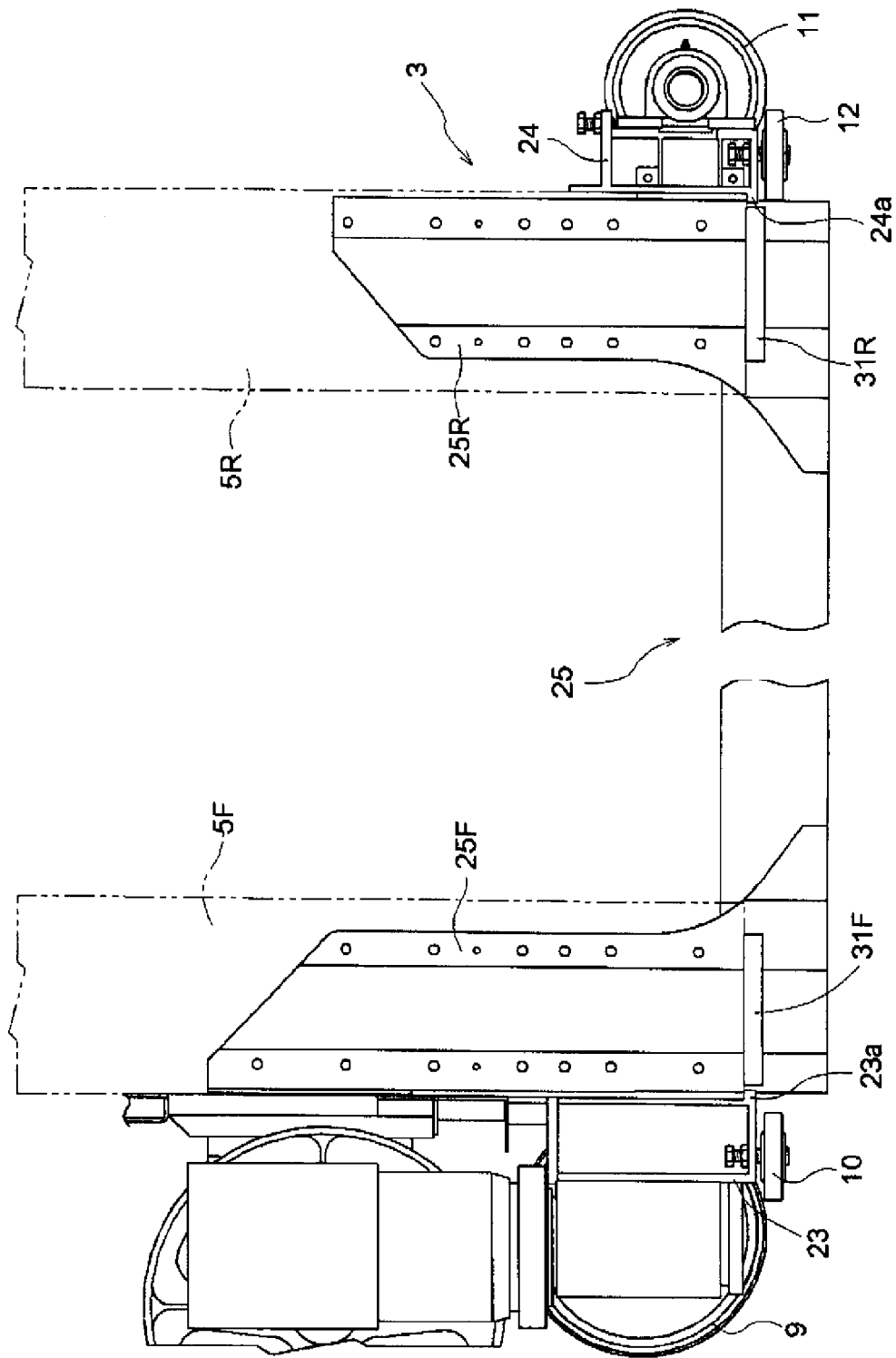
FIG. 11 is a partially hidden and fragmentary, side elevational view of the lower frame of FIG. 5, a part of which is omitted for clarity.

As depicted in FIGS. 9 and 11, a flange 23a for mounting the lower end of the front support rod 5F is formed at the lower end of the rear side surface of the driving wheel support frame 23, and the front support rod 5F mounted on the flange 23a is connected to the driving wheel support frame 23 by bolts inserted into bolt holes 23b formed within the upper end of the driving wheel support frame 23.

When connecting the front support rod 5F to the driving wheel support frame 23 by bolts, the above-explained connecting plate (tap plate) is inserted into the concave groove U of the front support rod 5F, then, the bolts inserted into the holes 23b are threaded to the connecting plate (tap plate).

Figure 6:
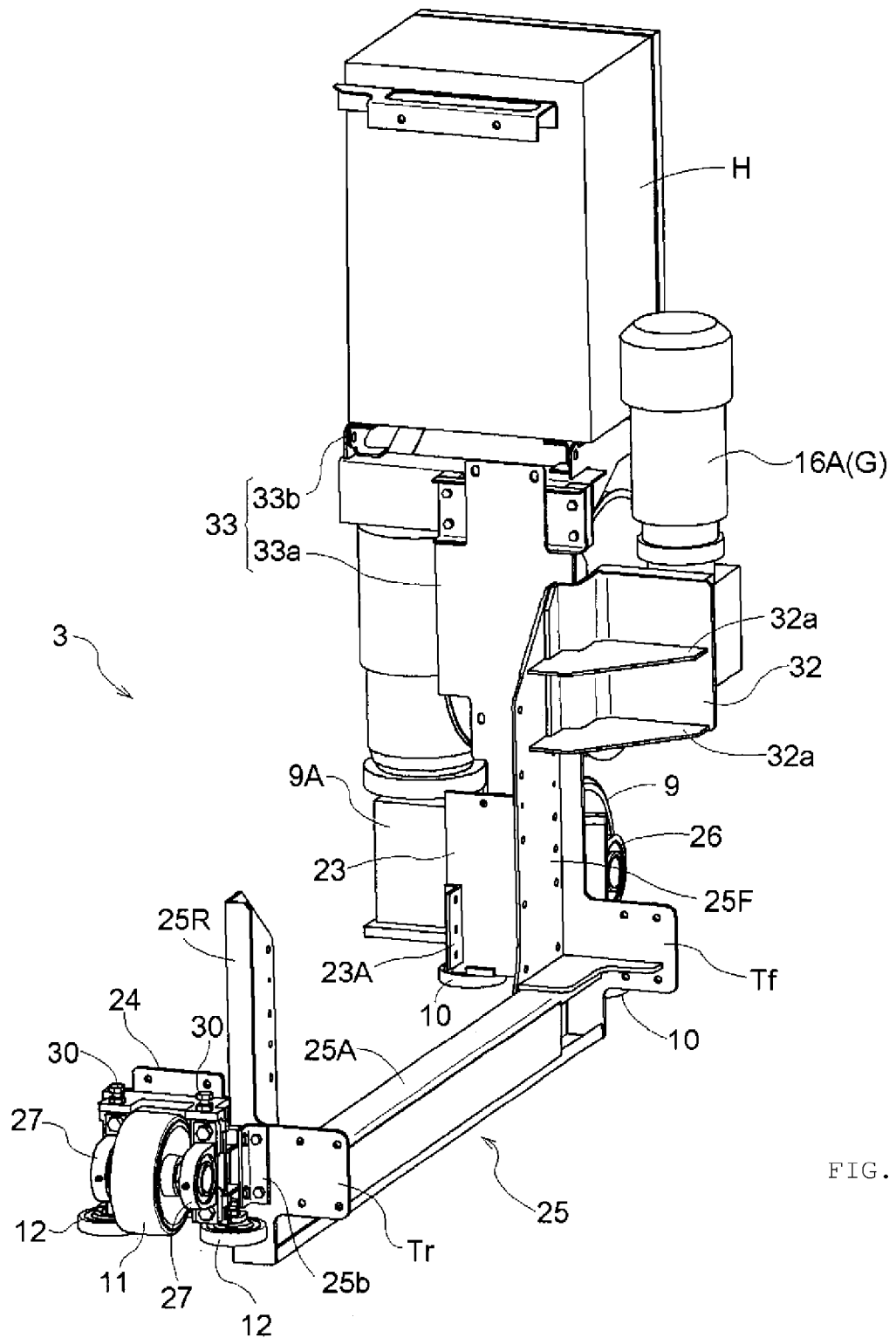
FIG. 6 is a perspective view of the lower frame of the stacker crane of FIG. 3.
Figure 12:
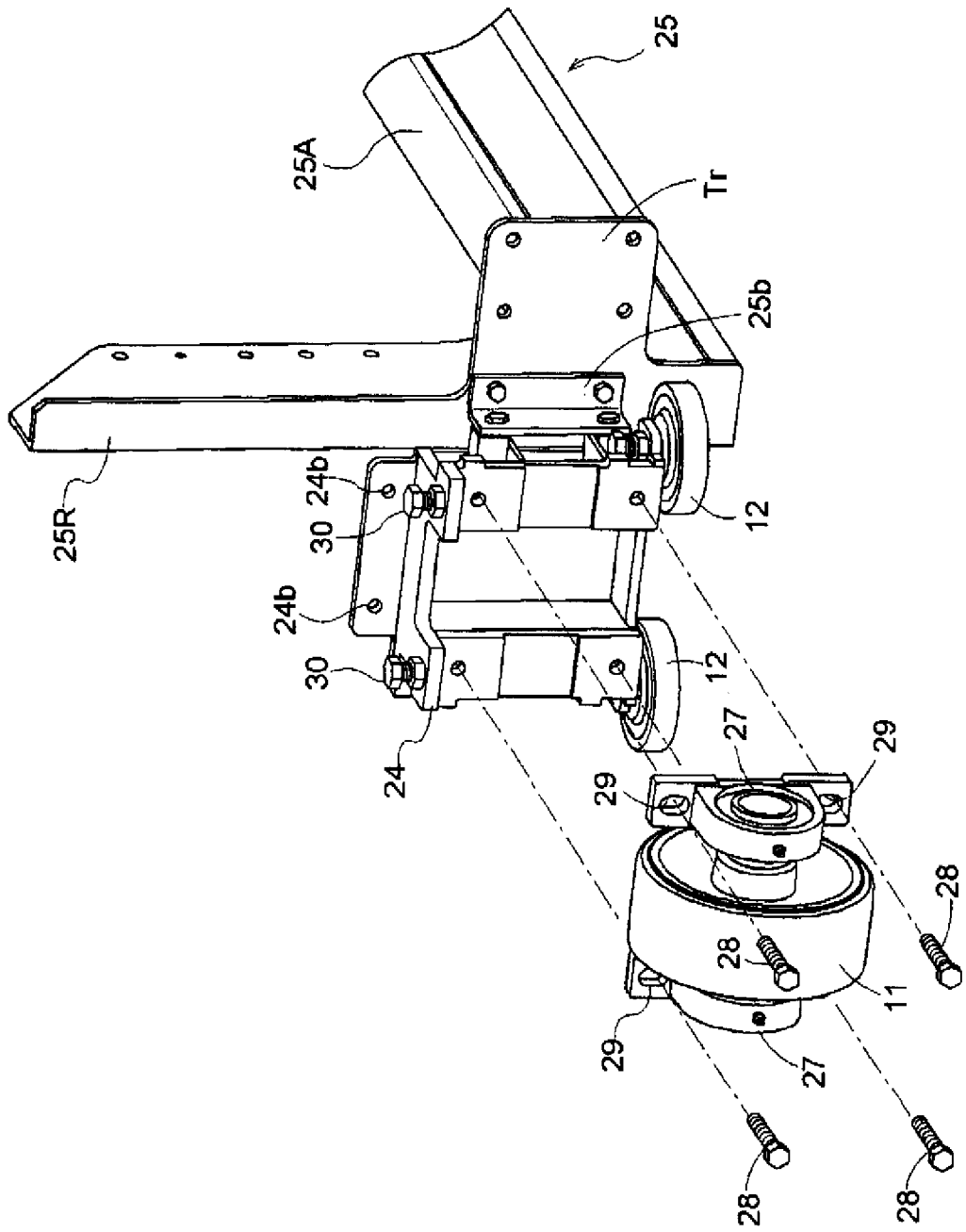
FIG. 12 is a fragmentary, partially exploded perspective view of an attachment of the idling wheel of the lower frame of FIG. 11.

As shown in FIGS. 6 and 12, the idling wheel support frame 24 has a reverse C-shape viewed from the top. A pair of left and right bearing units 27 for rotatably supporting the idling wheel 11 are fixed to a pair of left and right end surfaces of the rear side of the frame 24 by bolts.

It should be noted that the idling wheel 11 is rigged to the idling wheel support frame 24 such that the front side portion of the idling wheel 11 body is set between the left and right frame portions of the idling wheel support frame 24.

Figure 10:
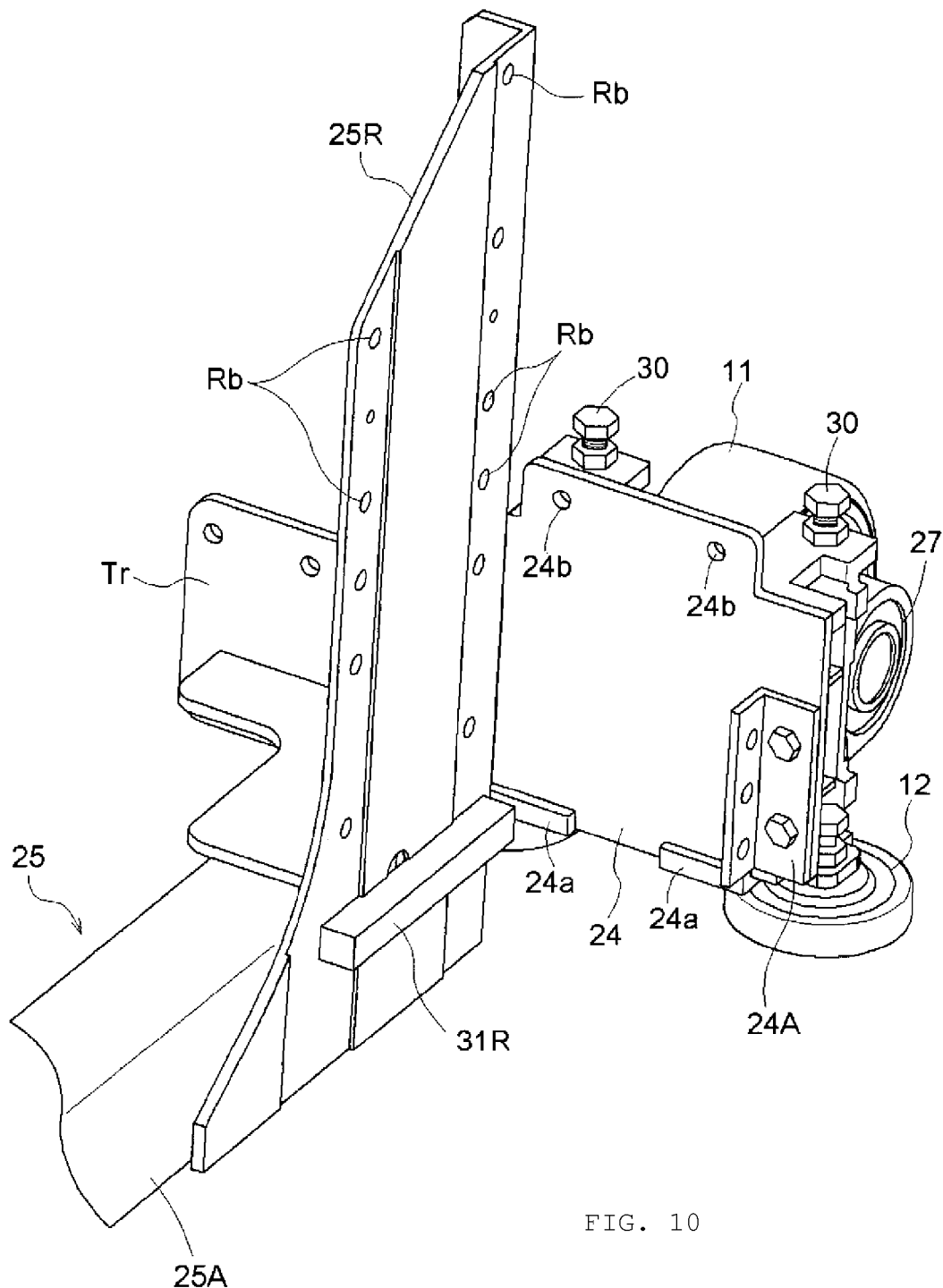
FIG. 10 is a fragmentary, perspective view of an attachment portion of the rear support rod in the lower frame of FIG. 5.

As illustrated in FIGS. 10 and 11, a flange 24a for mounting the lower end of the rear support rod 5R is formed at the lower end surface of the front side surface of the idling wheel support frame 24 and the rear support rod 5R mounted on the flange 24a is connected to the idling wheel support frame 24 by bolts inserted into bolt holes 24b formed at the upper end of the idling wheel support frame 24.

The bolt connection between the idling wheel support frame 24 and the rear support rod 5R is carried out in the same manner as that in the bolt connection between the driving wheel support frame 23 and the front support rod 5F.

As shown in FIG. 12, the holes 29 within the idling wheel support frame 24, through which bolts 28 are inserted to fix the pair of left and right bearing units 27 of the idling wheel 11 to the idling wheel support frame 24, respectively, are formed as vertically elongated holes, while position limiting bolts 30, by which the vertical movement of the bearing unit 27 of the idling wheel 11 is restricted against the idling wheel support frame 24, are threaded to the idling wheel support frame 24.

Therefore, by adjusting the forward or reverse rotation of the position limiting bolts 30, the vertical position of the bearing unit 27 of the idling wheel 11 with respect to the idling wheel support frame 24 can be adjusted. In accordance with this adjustment, the inclination in the body front and rear direction of the lower frame 3, i.e., the inclination of the stacker crane A, can be controlled.

The connecting frame 25 constituting the lower frame 3 is, as shown in FIGS. 5 to 8, provided on one of the sides in the body width direction, i.e. on the right side, of the driving wheel support frame 23 and the idling wheel support frame 24.

The connecting frame 25 comprises an attach portion 25a to the side surface of the driving wheel support frame 23 (see FIG. 5) and an attach portion 25b to the side surface of the idling wheel support frame 24 at the front and rear end portions of the main frame portion 25A extending in the front and rear directions, respectively (see FIG. 6).

That is to say, the sub frame portion 25F and 25R having an L-shape section viewed from the top are welded to each of the front-rear edges of the main frame portion 25A so as that they stand from the main frame portion 25A into an upper direction; and to the sub frame portion 25F and 25R, flaps bent to an L-shape constituting the attach portions 25a, 25b are welded to the sub frame portions 25F and 25R, respectively.

The main frame portion 25A is configured with the aid of die steel having a C-shaped cross section, inside of which an electric cable, etc. can be housed. In the exemplary embodiment shown in the drawings, a cover is mounted to close the opening at the side of the main frame portion 25A.

Tool attachments Tf and Tr for attaching tools for supporting the lower frame 3 in an suspended manner are integrated to the front sub frame portion 25F and the rear sub frame portion 25R.

That is to say, in an exemplary embodiment, the stacker crane A is transferred from the manufacturing site to the installation site in an exploded condition of lower frame 3, front and rear support rods 5F, 5R, upper frame 6, and platform 4, and is, then, assembled at the installation site. Thus, the lower frame is constructed such that the tools for supporting the lower frame 3 in a suspended manner from the floor surface can be mounted to the lower frame 3.

Figure 7:
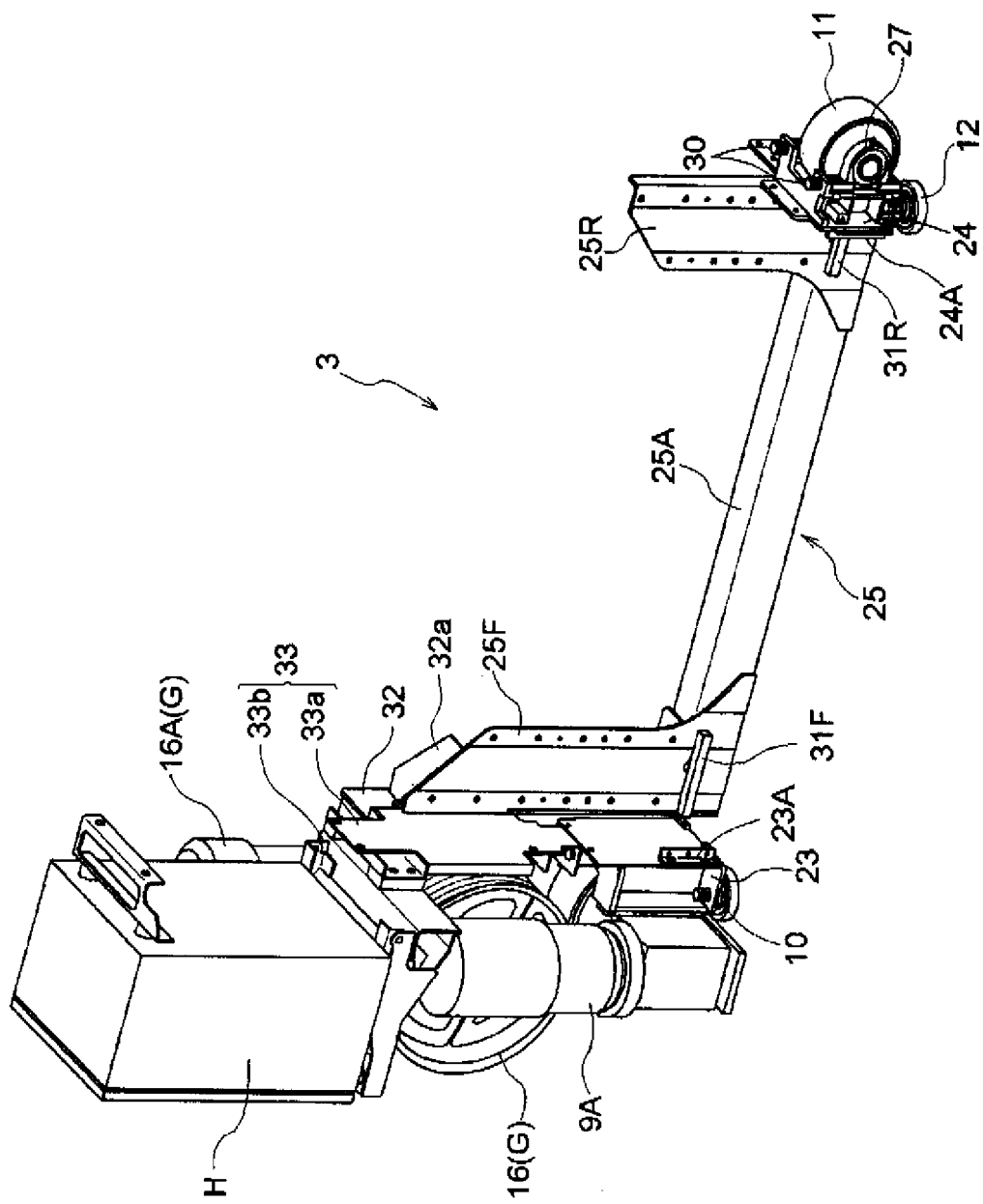
FIG. 7 is a perspective view of the lower frame of the stacker crane of FIG. 3.

As shown in FIGS. 7 and 9, at the lower end portion of the front sub frame 25F and located more to the inner side of the crane body than the main frame 25A, a mount 31F for mounting the right side portion of the lower end surface of the front support rod 5F is provided. The mount 31F is formed by attaching a rectangular axial shaped member for forming the mount to the front sub frame 25F by welding. It is noted that the mount holds the right side portion of the lower end surface of the front support rod 5F, which is different from the front side portion held by the flange 23a of the front wheel support frame 23.

Further, as shown in FIGS. 7 and 10, at the lower end portion of the rear sub frame 25R and located more to the inner side of at the crane body than the main frame 25A, a mount 31R for mounting the right side portion of the lower end surface of the rear supporting 5R is provided. The mount 31R is also formed by attaching a rectangular axial shaped member for forming the mount to the rear sub-frame 25R by welding. It should be noted that the mount holds the right side portion of the lower end surface of the front support rod 5R, which is different from the front side portion held by the flange 24a of the front wheel support frame 24.

As mentioned with regard to FIG. 9, the bolt insert holes Fb are formed within the portion of the front sub frame 25F, which is positioned more to the inside of the crane than the main frame portion 25A; this portion is connected to the side surface at the crane body inner side surface out of the side surfaces of the front support rod 5F by bolts.

That is to say, in this exemplary embodiment, the front sub frame portion 25F is connected to the right surface portion, which is different from the front surface portion being connected and supported by the front side wheel support frame 23 out of the side surfaces of the front support rod 5F, so as to function as a support for the front support rod to be connected to the right side surface.

As mentioned with regard to FIG. 10, the bolt insert holes Rb are formed within the portion of the rear sub frame 25R, which is positioned more to the inside of the crane than the main frame portion 25A; this portion is connected to the side surface at the crane body inner side surface out of the side surfaces of the rear support rod 5R by bolts.

That is to say, in this exemplary embodiment, the rear sub frame portion 25R is connected to the right surface, which is different from the rear surface portion being connected and supported by the rear side wheel support frame 24, out of the side surfaces of the rear support rod 5R, so as to function as a support for the rear support rod.

As seen from FIG. 9, at the left end of the driving wheel support frame 23, the L-shaped connecting plate 23A, which is to be connected to the left side surface of the front support rod 5F, is connected by bolts.

As seen from FIG. 10, at the left end of the idling wheel support frame 24, the L-shaped connecting plate 24A, which is to be connected to the left side surface of the near support rod 5R, is connected by bolts.

Therefore, as shown in FIG. 11, the front support rod 5F, by being connected to the driving wheel support frame 23, the front sub frame 25F, and the connecting plate 23A, by bolts under the condition that the lower end of the rod 5F is held and supported at the flange 23a of the driving wheel support frame 23 and on the mount 31F for front support rod, is thus supported by the lower frame 3.

Further, as shown in FIG. 11, the rear side support rod 5R is supported at the lower frame 3 by bolt connection with respect to the idling wheel support frame 24, the rear sub frame 25R, and the connecting plate 24A under the condition that the lower end of the rod 5R is held and supported on the flange 24a of the idling wheel support frame 24 and on the mount 31R for the rear side support rod.

As shown in FIGS. 6 and 8, an attachment frame 32 is welded to the upper end of the front sub frame 25F, to which a device G for driving the platform with a reel drum 16 and an electric motor 16A is attached. Upper and lower reinforcing members 32a are provided between the attachment frame 32 and the sub frame 25F.

The device G is attached to the attachment frame 32 by bolts at an upper portion of the front wheel support frame 23.

As seen from FIGS. 6 to 8, a control box H is mounted above the device G for driving the platform and is supported by a support frame 33. A controller for controlling the operation of the wheel driving motor 9A and/or the operation of the electric motor 16A for driving the reel drum 16 is stored in the control box H.

The support frame 33 for supporting the control box H has a lower frame portion 33a extended in a vertical direction and an upper frame portion 33b, which is extended backward from the upper end of the lower frame portion 33a, so that the control box H is, as shown in FIG. 7, mounted on the upper frame portion 33b and supported by the support frame 33 such that, as shown in FIG. 3, the upper end thereof is connected to the front support rod 5F.

Then, the lower end of the lower frame portion 33a is bolted to the upper end of the front wheel support frame 23 and the upper and lower intermediate portion and the upper end of the lower frame portion 33a are bolted to the front side support rod 5F. Furthermore, a right side peripheral portion of the lower frame portion 33a in the width direction of the body is bolted to the front sub frame 25F.

Figure 13:
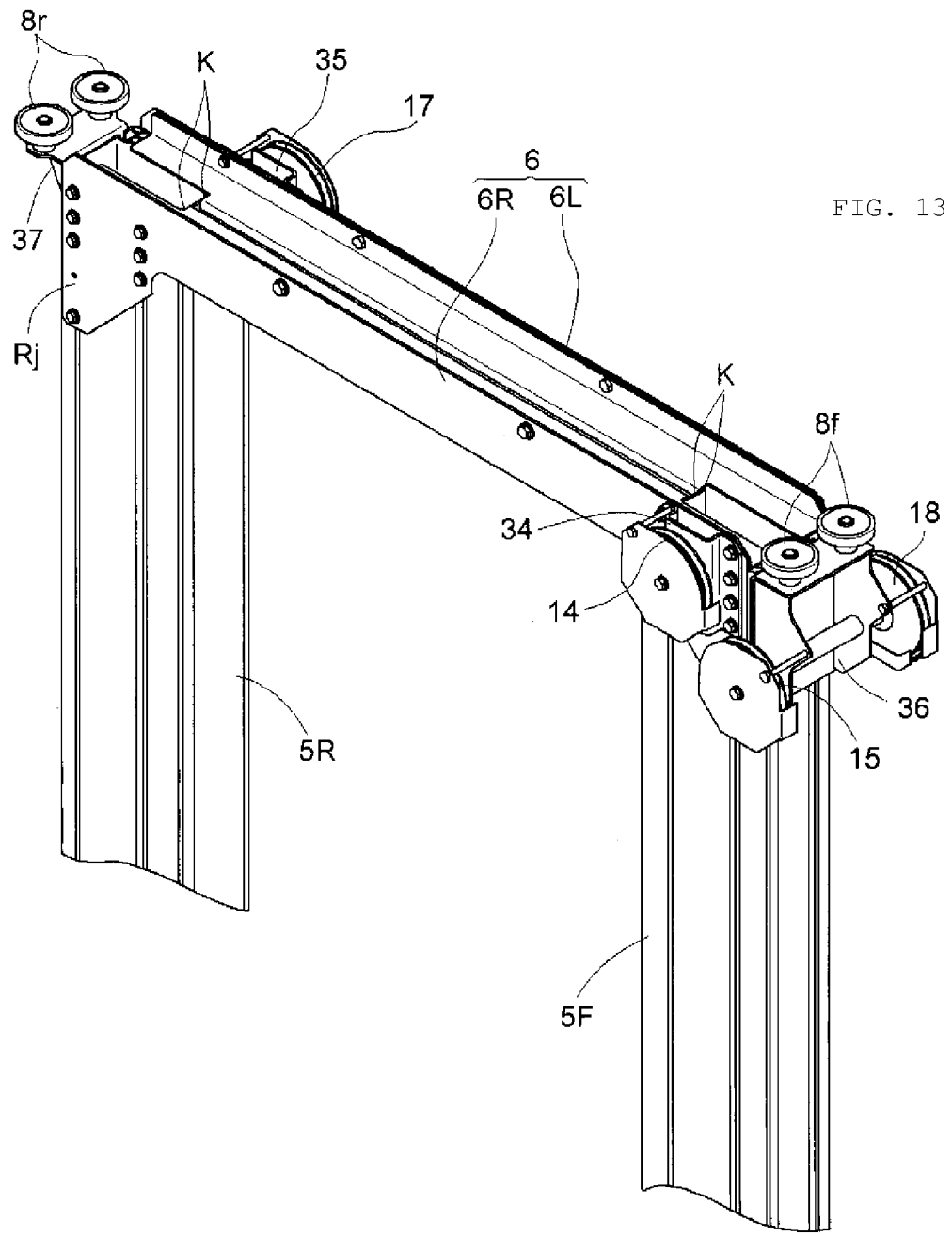
FIG. 13 is a fragmentary, perspective view of the upper frame of the stacker crane of FIG. 3.
Figure 15:
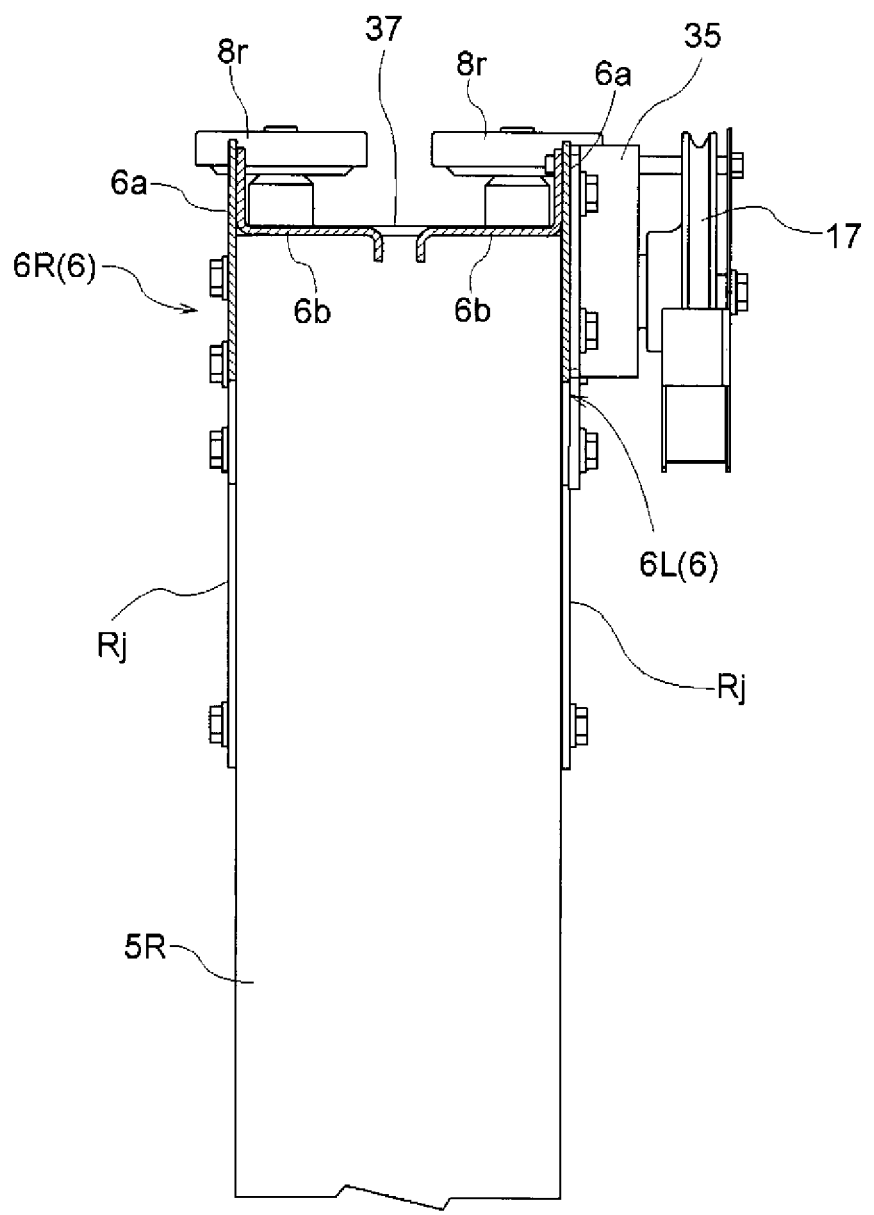
FIG. 15 is a fragmentary, vertical cross sectional view of the upper frame of FIG. 13.

As illustrated in FIGS. 13 to 15, the upper frame 6 of the stacker crane A is comprised of left and right frame portions 6L, 6R, which are connected to the front and rear support rods 5F, 5R, respectively.

The left and right frame portions 6L and 6R have the same structure, where elongated reinforcement member 6b is welded to the inside surface of the main portion 6a having a reversed U-like shape viewed from side; and the front and rear edges of the main portion 6a are formed at the bolt connecting portion Fj, Rj, with respect to the front support rod 5F or the rear support rod 5R.

That is to say, the left and right frames 6L and 6R are bolted to the front support rod 5F and rear support rod 5R under the condition that the bolt connecting portions Fj, Rj on the front and rear edges of the main portion 6a are being urged against the outside surfaces of the front support rod 5F and the rear support rod 5R, respectively.

When connecting the bolt connecting portions Fj, Rj on both ends of the main portion 6a to the front support rod 5F and the rear support rod 5R, respectively, the above-explained connecting plate is inserted into the concave groove U of the front and rear support rods 5F and 5R, and the bolts are threaded to the connecting plate.

As shown in FIG. 15, the reinforcing members 6b are formed on the left and right frame portions 6L and 6R, respectively. The members 6b are doubly bent, as viewed from the front and rear direction of the crane, and comprise a vertical plate urged against the inner surface of the main portions 6a, a horizontal plate extended from the lower end of the vertical plate toward inside thereof, and an extension plate extended downwardly from the edge of the horizontal plate.

Further, as shown in FIG. 14, the reinforcing members 6b have notches at the front and rear ends in the width direction. In other words, the front and rear edges K of the extended portion of the reinforcing portion 6b is located more inside than the front and rear edge of the horizontal portion thereof.

When performing the bolt connection of the connecting portions Fj, Rj at both the edges of the main portion 6a to the front support rod 5F or the rear support rod 5R, since the horizontal plate of the reinforcing member 6b is urged against the upper edge surface of the front support rod 5F or the rear support rod 5R, the vertical position of the left and right frame portions 6L and 6R with respect to the front support rod 5F or the rear support rod 5R can be limited.

Further, when performing the bolt connection of the connecting portions Fj, Rj at both the edges of the main portion 6a to the front support rod 5F or the rear support rod 5R, since the edge portions K on both the front and rear ends of the extension plate of the reinforcing members 6b are urged against the circumference surface of the front support rod 5F or the rear support rod 5R, the horizontal position of the left and right frame portions 6L and 6R in the front and rear direction of the body with respect to the front support rod 5F or the rear support rod 5R can be limited.

In the present exemplary embodiment, the first support 34 for rotatably supporting the first guide 14 is connected to the front support rod 5F by bolts while being urged against the outer surface of the front side bolt connecting portion Fj of the right side frame portion 6R of the upper frame 6. The first guide 14 guides the lifting wire 13A, which is connected to the body front side of the platform 4, out of the lifting wires 13A and 13B.

Further, the second support 35 for rotatably supporting the third guide 17 is connected by bolts to the rear support rod 5R while being urged against the outer surface of the rear side mast connecting portion Rj of the left side frame portion 6L of the upper frame 6. The third guide 17 guides the lifting wire 13B, which is connected to the body rear side of the platform 4, out of the lifting wires 13A and 13B.

Furthermore, the second guide 15 for guiding the lifting wire 13A, which has been guided downward by the first guide 14, and the fourth guide 18 for guiding the lifting wire 13B, which has been guided downward by the third guide 17 are commonly supported by the third support 36. The third support 36 is connected to the front surface of the front support rod 5F by bolts.

Moreover, the third support 36 is configured to support the front side left and right guide rollers 8f from amongst the front and rear guide rollers 8f and 8r, which are being urged against the guide rail 7 on the ceiling.

The fourth support 37, which is connected to the rear support rod 5R by bolts, is configured to support the rear side left and right guide rollers 8r from amongst of the front and rear side guide rollers 8f and 8r, which are being urged against the guide rail 7 on the ceiling.

The other exemplary embodiments are listed below.

(1) In the above-explained first exemplary embodiment, the lower end surfaces of the front and rear support rods are mounted not only on the driving wheel support frame or the flange of the idling wheel support frame but also on the mount for rod provided on the lower frame. However, the mount for the rods can be omitted.

(2) In the first exemplary embodiment, a driving wheel and an idling wheel are provided as running wheels. However, it is possible to provide driving wheels on both the back and front of the lower frame.

(3) In the first exemplary embodiment, the connecting frame is arranged on only one side of the front and rear wheel support frame, but can be arranged on both sides of the wheel support frame.

(4) In the first exemplary embodiment, the stacker crane having long front and rear support rods, for instance, several ten meters long, is disclosed. However, the present invention can also be applied to stacker cranes where the front and rear support rods are shorter, for instance several meters long.

LIST OF NUMERICAL REFERENCES 2 rail
3 lower frame
4 platform
5F, 5R support rod
6 upper frame
9 running wheel (driving wheel)
11 running wheel (idling wheel)
23, 24 wheel support frame
23a flange
24a flange
25 connecting frame
25F sub frame portion
25R sub frame portion
31F mount for front support rod
31R mount for rear support rod The foregoing description and accompanying drawings illustrate the principles, exemplary embodiments, and modes of operation of the invention. However, the invention should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A stacker crane, comprising:
a lower frame having:
front and rear end portions;
running wheels operable to freely run along at least one rail having a horizontal axis, the running wheels disposed at both of the front and rear end portions;
front and rear wheel support frames operable to support the running wheels, each of the front and rear wheel support frames having an upper end portion located above its respective running wheel and a lower end portion located at or below its respective running wheel such that:
the upper end portion of the front wheel support frame is located in an upward direction along a vertical axis from the lower end portion of the front wheel support frame; and
the upper end portion of the rear wheel support frame is located in an upward direction along a vertical axis from the lower end portion of the rear wheel support frame; and
a connecting frame connecting the front and rear wheel support frames to each other;
front and rear support rods respectively standing from the front and rear end portions of the lower frame, the front and rear support rods:
each having upper end portions;
each having a lower end surface;
each having a side surface; and
being disposed respectively at the front and rear end portions of the lower frame,
the lower end portion of the front wheel support frame having a first flange portion operable to hold and mount directly thereto the lower end surface of the front support rod,
the lower end portion of the rear wheel support frame having a second flange portion operable to hold and mount directly thereto the lower end surface of the rear support rod,
the lower end surface of the front support rod being held by the first flange portion on the front wheel support frame,
the side surface of the front support rod being connected and supported by the front wheel support frame,
the lower end surface of the rear support rod being held by the second flange portion on the rear wheel support frame, and
the side surface of the rear support rod being connected and supported by the rear wheel support frame;
an upper frame connected to the upper end portions of the front and rear support rods; and
a platform guided by the front and rear support rods and operable to be freely lifted in the upward direction along the vertical axis and lowered in a downward direction along the vertical axis.

2. The stacker crane according to claim 1, wherein the connecting frame comprises:
a first mount portion for the front support rod operable to hold and mount another portion of the lower end surface of the front support rod that is different from the portion held by the first flange portion of the front wheel support frame; and
a second mount portion for the rear support rod operable to hold and mount another portion of the lower end surface of the rear support rod that is different from the portion held by the second flange portion of the rear wheel support frame.

3. The stacker crane according to claim 2, wherein the connecting frame comprises:
a first support for the front support rod, the first support being connected to a portion of the side surface of the front support rod other than that being connected and supported by the front wheel support frame; and
a second support for the rear support rod, the second support being connected to a portion of the side surface of the rear support rod other than that being connected and supported by the rear wheel support frame.

4. The stacker crane according to claim 2, wherein:
the front wheel support frame has a rear side;
the rear wheel support frame has a front side;
the front support rod is at the rear side of the front wheel support frame; and
the rear side support rod is at the front side of the rear wheel support frame.

5. The stacker crane according to claim 2, wherein:
the front wheel support frame has lateral sides;
the rear wheel support frame has lateral sides; and the connecting frame is respectively disposed at one of the lateral sides of the front and rear wheel support frames.

6. The stacker crane according to claim 2, wherein:
one of the running wheels provided at the front and rear end portions of the lower frame is a driving wheel; and
the other of the running wheels is an idling wheel adjustably rigged to the wheel support frame in a vertical direction.

7. The stacker crane according to claim 1, wherein the connecting frame comprises:
a first support for the front support rod, the first support being connected to a portion of the side surface of the front support rod other than that being connected and supported by the front wheel support frame; and
a second support for the rear support rod, the second support being connected to a portion of the side surface of the rear support rod other than that being connected and supported by the rear wheel support frame.

8. The stacker crane according to claim 7, wherein:
the front wheel support frame has a rear side;
the rear wheel support frame has a front side;
the front support rod is at the rear side of the front wheel support frame; and
the rear side support rod is at the front side of the rear wheel support frame.

9. The stacker crane according to claim 7, wherein:
the front wheel support frame has lateral sides;
the rear wheel support frame has lateral sides; and
the connecting frame is respectively disposed at one of the lateral sides of the front and rear wheel support frames.

10. The stacker crane according to claim 7, wherein:
one of the running wheels provided at the front and rear end portions of the lower frame is a driving wheel; and
the other of the running wheels is an idling wheel adjustably rigged to the wheel support frame in a vertical direction.

11. The stacker crane according to claim 1, wherein:
the front wheel support frame has a rear side;
the rear wheel support frame has a front side;
the front support rod is at the rear side of the front wheel support frame; and
the rear side support rod is at the front side of the rear wheel support frame.

12. The stacker crane according to claim 11, wherein:
the front wheel support frame has lateral sides;
the rear wheel support frame has lateral sides; and
the connecting frame is respectively disposed at one of the lateral sides of the front and rear wheel support frames.

13. The stacker crane according to claim 11, wherein:
one of the running wheels provided at the front and rear end portions of the lower frame is a driving wheel; and
the other of the running wheels is an idling wheel adjustably rigged to the wheel support frame in a vertical direction.

14. The stacker crane according to claim 1, wherein:
the front wheel support frame has lateral sides;
the rear wheel support frame has lateral sides; and
the connecting frame is respectively disposed at one of the lateral sides of the front and rear wheel support frames.

15. The stacker crane according to claim 14, wherein:
one of the running wheels provided at the front and rear end portions of the lower frame is a driving wheel; and
the other of the running wheels is an idling wheel adjustably rigged to the wheel support frame in a vertical direction.

16. The stacker crane according to claim 1, wherein:
one of the running wheels provided at the front and rear end portions of the lower frame is a driving wheel; and
the other of the running wheels is an idling wheel adjustably rigged to the wheel support frame in a vertical direction.

17. A stacker crane, comprising:
a lower frame having:
  front and rear end portions;
  running wheels operable to freely run along at least one rail having a horizontal axis, the running wheels disposed at both of the front and rear end portions;
  front and rear wheel support frames operable to support the running wheels, each of the front and rear wheel support frames having an upper end portion located above its respective running wheel and a lower end portion located at or below its respective running wheel such that:
    the upper end portion of the front wheel support frame is located in an upward direction along a vertical axis from the lower end portion of the front wheel support frame; and
    the upper end portion of the rear wheel support frame is located in an upward direction along a vertical axis from the lower end portion of the rear wheel support frame; and
  a connecting frame connecting the front and rear wheel support frames to each other;
front and rear support rods respectively standing from the front and rear end portions of the lower frame, the front and rear support rods:
  each having upper end portions;
  each having a lower end surface;
  each having a side surface; and
  being disposed respectively at the front and rear end portions of the lower frame,
  the lower end portion of the front wheel support frame having a first flange portion operable to hold and mount directly thereto the lower end surface of the front support rod,
  the lower end portion of the rear wheel support frame having a second flange portion operable to hold and mount directly thereto the lower end surface of the rear support rod,
  the lower end surface of the front support rod being held by the first flange portion on the front wheel support frame,
  the side surface of the front support rod being connected and supported by the front wheel support frame,
  the lower end surface of the rear support rod being held by the second flange portion on the rear wheel support frame,
  the side surface of the rear support rod being connected and supported by the rear wheel support frame, and
  the connecting frame comprises:
    a first mount portion for the front support rod operable to hold and mount another portion of the lower end surface of the front support rod that is different from the portion held by the first flange portion of the front wheel support frame; and
    a second mount portion for the rear support rod operable to hold and mount another portion of the lower end surface of the rear support rod that is different from the portion held by the second flange portion of the rear wheel support frame;
an upper frame connected to the upper end portions of the front and rear support rods; and a platform guided by the front and rear support rods and operable to be freely lifted in the upward direction along the vertical axis and lowered in a downward direction along the vertical axis.

* * * * *